W. J. KENT.
MACHINE FOR CUTTING SUGAR CANE TRASH.
APPLICATION FILED DEC. 8, 1911.
1,070,346.
Patented Aug. 12, 1913.
3 SHEETS—SHEET 2.
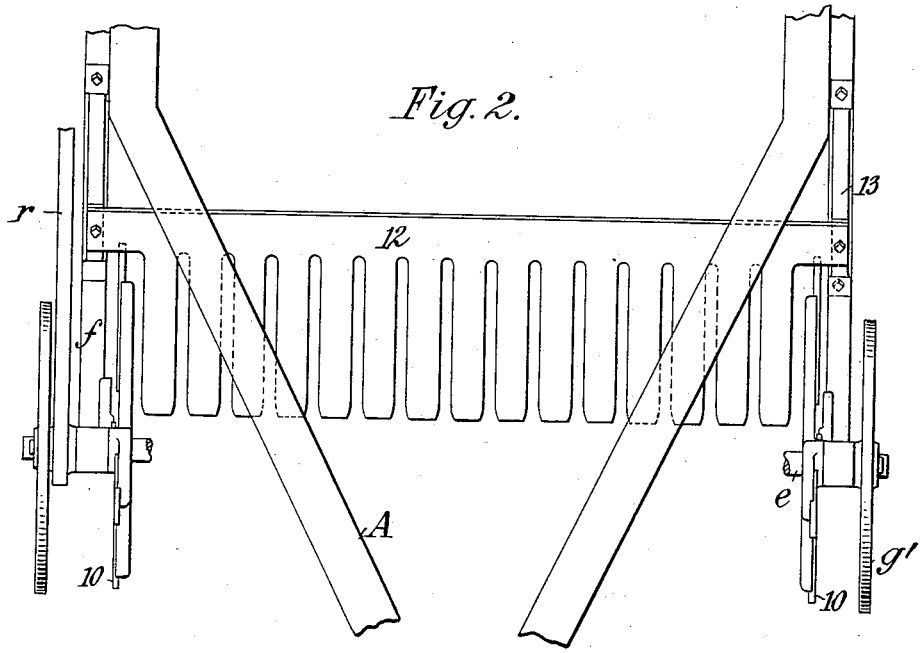
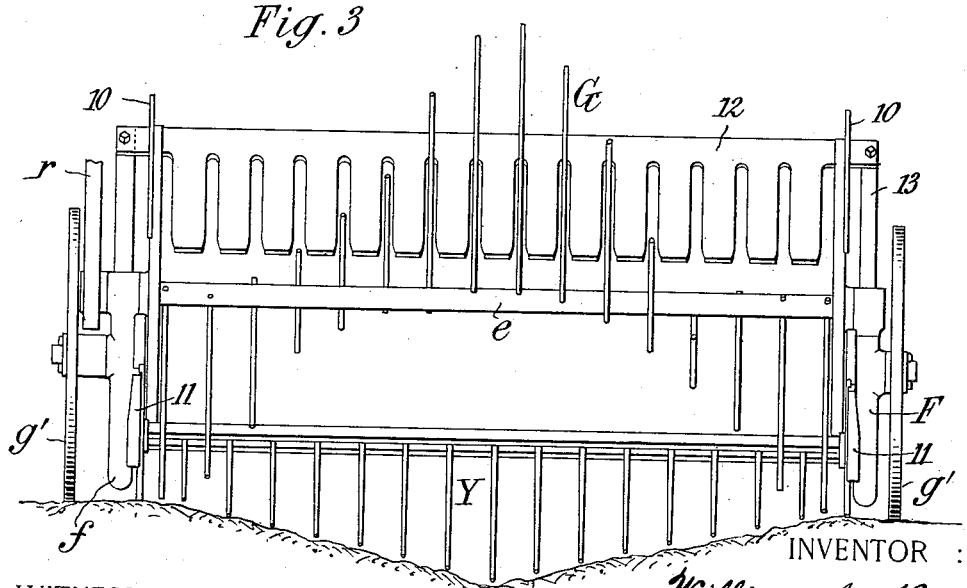
WITNESSES:
INVENTOR:
William J. Kent,
By Attorneys,

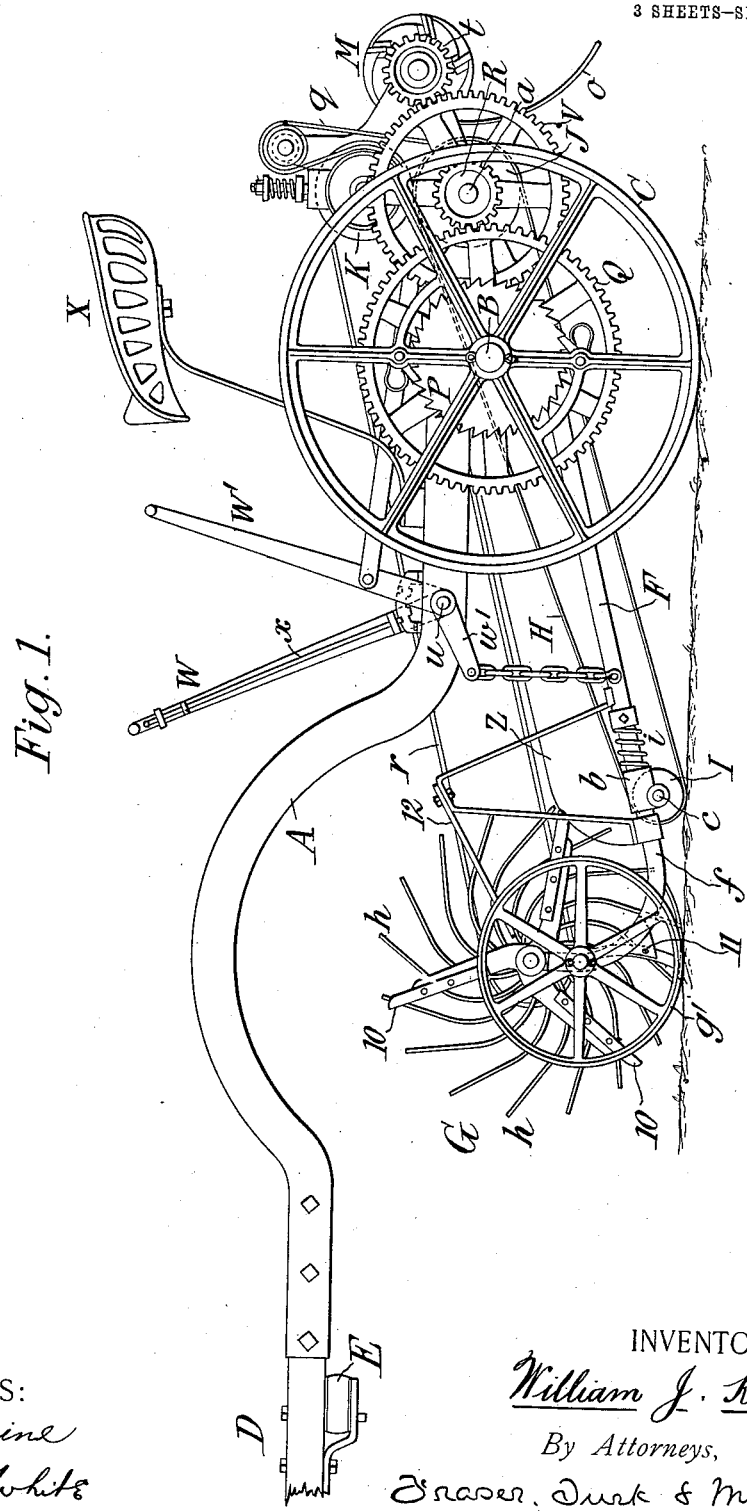

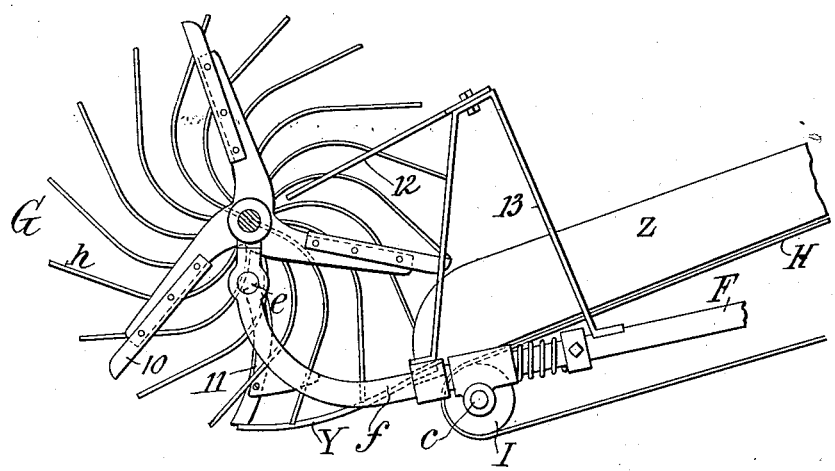
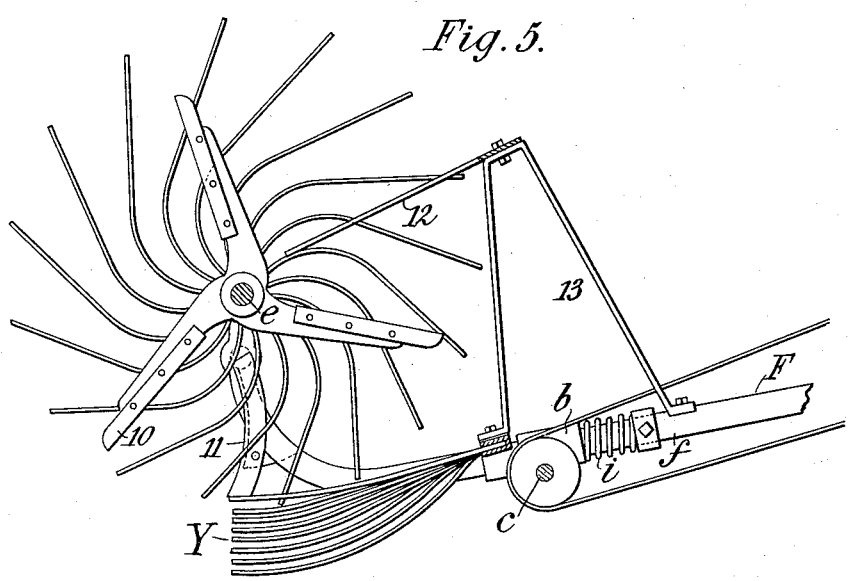

UNITED STATES PATENT OFFICE.

WILLIAM J. KENT, OF NEW YORK, N. Y.

MACHINE FOR CUTTING SUGAR-CANE TRASH.

1,070,346.  Specification of Letters Patent.  Patented Aug. 12, 1913.

Application filed December 8, 1911. Serial No. 664,636.

*To all whom it may concern:*

Be it known that I, WILLIAM J. KENT, a citizen of the United States, residing in the borough of Brooklyn, county of Kings, city and State of New York, have invented certain new and useful Improvements in Machines for Cutting Sugar-Cane Trash, of which the following is a specification.

The present invention provides certain improvements upon the apparatus set forth in my Patent No. 885,486 granted April 21, 1908.

The accompanying drawings show a machine embodying the present invention.

Figure 1 is a side elevation; Fig. 2 is a fragmentary plan; Fig. 3 is a partial front elevation; Fig. 4 is a fragmentary side elevation showing a portion of Fig. 1 on a large scale, the view being partly in vertical section; Fig. 5 is a similar view to Fig. 4 showing a slightly different construction.

Referring to the drawings, A shows the main frame, B is the rear axle, C one of the draft wheels, D the pole, and E the whiffle tree. F is a swing frame carrying the revolving rake G and the front of a conveyer H which consists of a belt or apron passing over opposite rollers I and J. The trash is swept from the ground by the rake on to the conveyer H, which carries it upward and backward, and it is then squeezed between rollers J and K and by them fed to a cutter M which chops it into small pieces which, falling over the plate O, are distributed on the ground. The machine is driven from the wheels C through ratchets P and gearing Q, R, V and $t$. A chain $q$ drives the shaft of roller K, and this in turn through a chain $r$ drives the rake G, which revolves in the same direction as the drive wheel C but at higher speed. All of these parts are described in detail in my said Patent No. 885,486, to which reference is made for a complete understanding thereof.

The machine here shown has wheels $g'$ to support the front of the frame F. A lever W is provided for raising the frame F, with a lock $x$ for locking it either up or down. Instead of using the same lever to operate the clutch (shown in Fig. 6 of my said patent) by which the driving gears are thrown into or out of mesh, the present machine has a separate lever W' for this purpose.

In all other respects the parts which are shown in, and which are marked by identical letters of reference to those of, my said former patent, are the same or substantially the same, and reference is made to my said patent for a full description thereof.

My present invention provides (1) means for cutting the trash or canes at the sides of the machine to prevent their clogging the conveyer; (2) means for clearing the teeth of the revolving rake G; and (3) means for insuring the picking up of the trash from the field when the latter is not level but is plowed according to the custom of some countries in a succession of shallow furrows.

For cutting the trash at the sides of the machine I provide cutters or shears 10 fixed on the same shaft $e$ that carries the revolving rake G. These cutters are shown as having three cutting blades, but a greater or less number may be used. These blades make a shearing cut against a fixed blade 11 mounted on the side bars $f$ $f$ of the frame F. The knives 10, 10 thus act to chop across any trash or canes which are partly within and partly outside the path or swath traversed by the machine. It has been found that if these are not cut they are liable to clog the conveyer and to require frequent clearing. The application of these cutting knives or shears therefore greatly improves the machine and enables it to operate with less attention and more continuously and rapidly.

For clearing the teeth of the revolving rake G, I provide a clearing comb 12 which is mounted at an angle back of the rake and extends preferably in a plane which approximates a position radial to the axis of rotation of the rake. The clearer is mounted upon a frame 13 or any other suitable support. The teeth of the clearer comb are arranged to enter between the rake teeth, as best shown in Fig. 3. In operation, the rake teeth engage the comb near their hub, and as they move through the space or slot between the comb teeth they drag through it in such manner, as best shown in Figs. 4 and 5, that any pieces of trash or refuse adhering to the rake teeth are almost certain to be pulled off by the clearer comb. When thus detached from the rake teeth the pieces will naturally fall, and if encountered by any of the succeeding teeth will be thrown backward, so that in any event they find their way onto the conveyer.

In my said prior patent I showed at the front of the frame F a comb Y for lifting the trash from the ground and guiding it up onto the conveyer. This comb is shown in Fig. 4. Such guide is suitable for level ground, but is not suited for lifting the trash from hollows or dead furrows when these are present in the field. In some countries it is customary to plow and otherwise prepare the ground in a succession of longitudinal parallel hollows forming shallow dead furrows, one of which is shown in cross-section in Fig. 3. Where such is the custom, I construct the machine with the comb Y having teeth of varying degrees of downward projection, as best shown in Figs. 3 and 5. The comb teeth Y may be made adjustable or be bent to the position required by the particular contour of the surface of the ground. They thus adapt themselves to the contour of the ground and lift the trash and bring it within reach of the revolving rake G.

The improvements herein described tend greatly to the facility of operation of the machine, and to the thoroughness with which it picks up the trash from the ground.

My present improvements may be applied to a machine for any of the purposes suggested in my former patent.

I claim as my invention:—

1. In a machine for the purposes set forth, a frame, a rake for sweeping the trash from the ground, a conveyer, and a cutter at the side of the machine coöperating with said rake for severing the material to prevent its clogging the conveyer.

2. In a machine for the purposes set forth, a frame, a rake for sweeping the trash from the ground, a conveyer, and cutters at opposite sides of the machine coöperating with said rake for severing the material to prevent its clogging the conveyer.

3. In a machine for the purposes set forth, a frame, a rake for sweeping the trash from the ground, a conveyer, and a cutter at the side of the machine coöperating with said rake and comprising a revolving part carrying knives and a fixed shear blade.

4. In a machine for the purposes set forth, a frame, a revolving rake having elastic drag teeth curved and inclined rearwardly with respect to its direction of rotation, and a clearer comb having teeth inclined relatively to said drag teeth whereby the latter draw between the comb teeth and the comb teeth act outwardly against the rake teeth, whereby to strip from them fibrous matter which may be carried around with them.

5. In a machine for the purposes set forth, a frame, a conveyer, a rearwardly revolving rake, adapted to pick up material from the ground and transfer it to the conveyer, and a forwardly projecting comb carried by said frame projecting beneath said revolving rake, and having teeth at different heights and adapted to conform to the surface of the ground and lift the trash therefrom and guide it onto the conveyer.

In witness whereof, I have hereunto signed my name in the presence of two subscribing witnesses.

WILLIAM J. KENT.

Witnesses:
THOMAS F. WALLACE,
FRED. W. KRIMMERT.

---

Copies of this patent may be obtained for five cents each, by addressing the "Commissioner of Patents. Washington, D. C."